H. A. KROH.
SHACKLE.
APPLICATION FILED JUNE 7, 1919.
1,378,798. Patented May 17, 1921.
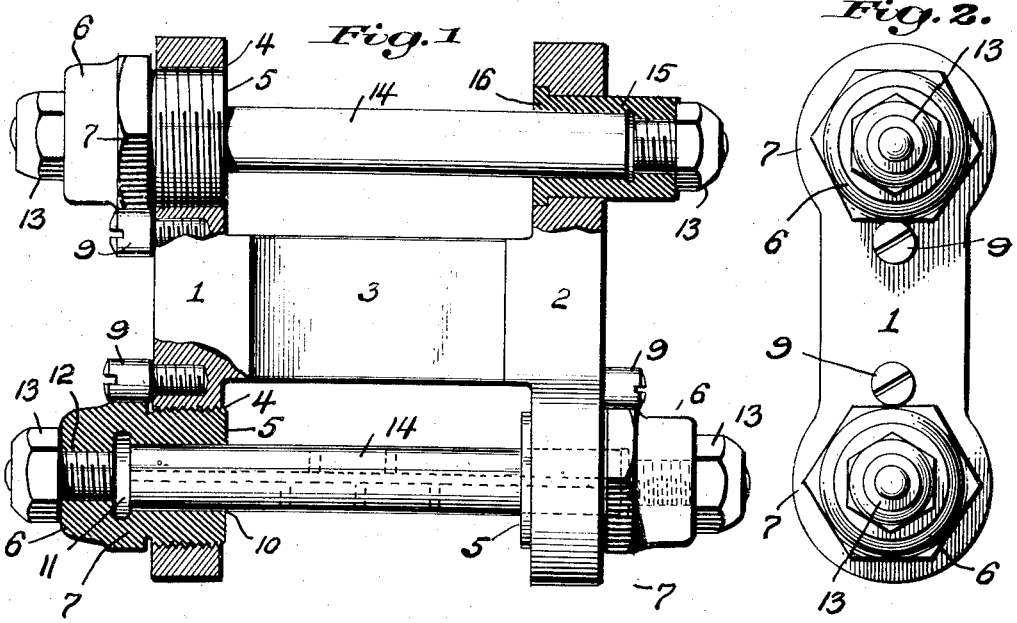
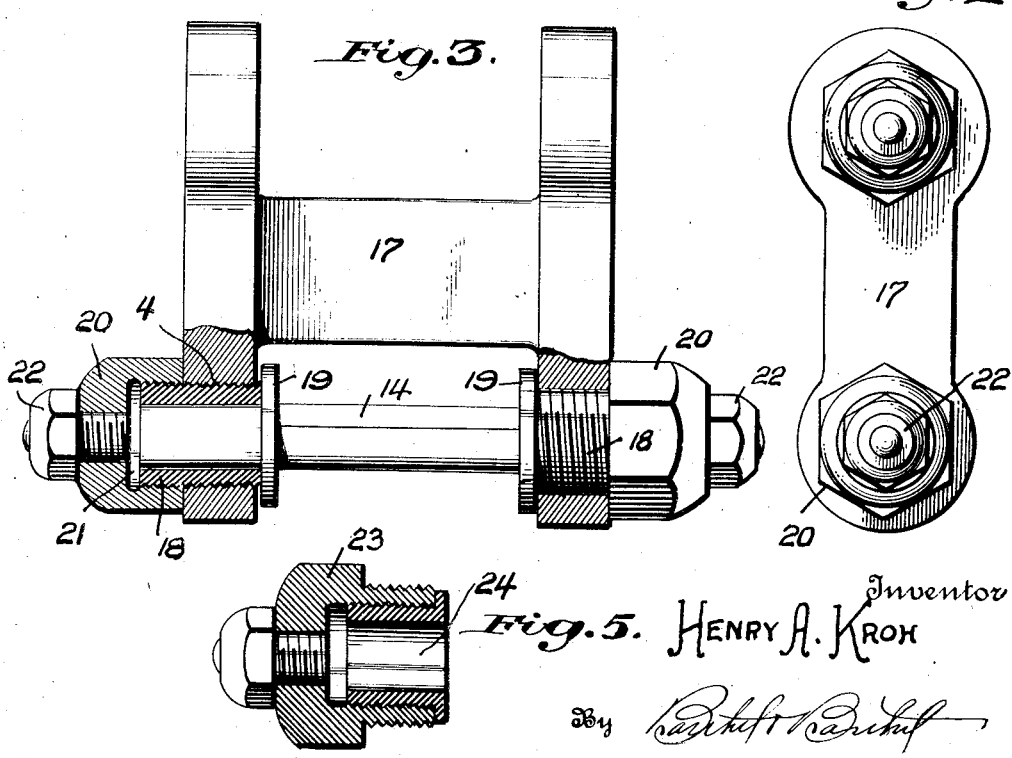
Inventor
Henry A. Kroh
By [signature]
Attorneys

UNITED STATES PATENT OFFICE.

HENRY A. KROH, OF DETROIT, MICHIGAN.

SHACKLE.

1,378,798.     Specification of Letters Patent.     Patented May 17, 1921.

Application filed June 7, 1919. Serial No. 302,486.

*To all whom it may concern:*

Be it known that I, HENRY A. KROH, a citizen of the United States of America, residing at Detroit, in the county of Wayne and State of Michigan, have invented certain new and useful Improvements in Shackles, of which the following is a specification, reference being had therein to the accompanying drawings.

The primary object of my invention is to provide a shackle or connecting member wherein positive and reliable means are employed in a manner as hereinafter set forth, for compensating for the side wear and thrust of springs or other elements connected by the shackle, which has been especially designed for connecting the ends of springs to a vehicle body or to each other.

Another object of my invention is to furnish a shackle or connecting member with detachable and renewable bushings or bearings, which besides being adjustable to take up wear and eliminate noise, are constructed to provide lubricant pockets or chambers so that a suitable lubricant may be at all times supplied to wearing parts of the shackle, springs or other members connected thereto.

A further object of my invention is to provide a shackle or connecting member with floating pins which are self adjusting and may have the wear thereon equally distributed. With the pins shiftable in the shackle there is a better chance for lubricant to be distributed on wearing parts and it is possible to quickly renew a pin should it be necessary.

A still further object of my invention is to provide a spring shackle wherein the parts are constructed with a view of reducing the cost of maintenance and replacement, and at the same time retain those features by which safety, durability and ease of adjustment are secured. With such ends in view, my invention resides in the novel construction to be hereinafter described and then claimed, and reference will now be had to the drawings, wherein—

Figure 1 is a front elevation of a spring shackle, partly broken away and partly in section;

Fig. 2 is a side elevation of the same;

Fig. 3 is a front elevation of the shackle, partly broken away and partly in section, illustrating a slight modification of my invention;

Fig. 4 is a side elevation of the same, and

Fig. 5 is a longitudinal sectional view of another form of my invention.

In the drawing, the reference numerals 1 and 2 denote shackle arms maintained in fixed, spaced, parallel relation by an integral connecting member 3 which may be as shown, intermediate the ends of said arms, thereby providing a rigid shackle structure that is somewhat H-shaped in front elevation.

Considering the lower opposed ends of the arms 1 and 2 as shown in Fig. 1, said arms are provided with alining interiorly screwthreaded openings 4 to receive bushings or bearings 5. The outer ends of said bushings terminate in caps 6 having nut portions 7 and a screw 9 or other locking device is attached to the shackle arms 1 and 2 to engage facets of the nut portions 7 and prevent accidental rotation or displacement of the bushings 5. The bushings 5 are of a sufficient length to protrude from the inner or confronting faces of the arms 1 and 2 and the bores 10 of said bushings terminate in lubricant pockets or chambers 11 in the caps 6 or the nut portions 7 thereof, said pockets or chambers constituting reservoirs for a lubricant that may be placed therein through filling openings 12 normally closed by detachable plugs 13 that may be conveniently in the form of screws having nut heads. It is possible to substitute lubricant or grease cups for the plugs 13 and thus afford a constant supply of lubricant or grease to the pockets 11.

Loose in the bores 10 of the bushings 5 is a transverse pin 14 which has its ends floating in the bushings 5 and receiving lubricant from the lubricant pocket 11 in each bushing. The pin 14 is of such a length that it may have a lengthwise or rotary movement or both, and besides rotating in the bushings it may rotate in the spring eye or device which it supports, automatically choosing the least frictional resistance of the moment. With the pin 14 loose in the bushings 5, said bushings may be repeatedly adjusted so that the confronting ends of the bushing will engage the sides of a spring eye or other device on the pin 14 and prevent rattling and wear incident to a loose connection between the shackle and the spring eye. By providing such adjustment the joint may be kept so close that dirt and water will be excluded and wear reduced. It is believed that with the pin 14 floating relative to the bushing that the same will be evenly worn, and should it be necessary to renew the pin, it is an extremely easy matter to remove the bushings 5 and substitute another pin. The same is true of the bushings 5 should the inner end thereof be worn to such an extent as not to correctly position the spring eye on the pin 14 between the shackle arms.

A few modifications of the bushing have been shown, the first being at the upper end of the arm 2 shown in Fig. 1, where a bushing 15 is non-adjustable in the arm 2 and has the inner end thereof provided with a head 16 set in the inner face of said arm, so that there can be no outward movement of the bushing all the adjustment being obtained from the screw bushing at opposite sides of the shackles.

Another form of bushing has been illustrated in Figs. 3 and 4, wherein the openings 4 of the shackle 17 receive tubular bushings 18 having the inner ends thereof provided with heads 19. The tubular bushings 18 are screwed into the shackle arms and the outer ends of said bushings are inclosed by cap nuts 20 affording lubricant pockets 21, which may be filled by removing the plugs 22. The cap nuts 20 abut the outer faces or walls of the shackle arms and serve as jam nuts for locking the tubular bushings in an adjusted position in the shackle arms.

A further modification of my invention is shown in Fig. 5, wherein a bushing 23, somewhat similar to the bushings 5, has a renewable liner 24, said liner being screwed or pressed into the bushing to coöperate therewith in providing a lubricant pocket. This detachable liner increases the longevity of the bushing 23 as it may be made of special metal or of metal specially treated or hardened.

As shown in Fig. 1, the pin 14 may have longitudinal and radial ports for the distribution of a lubricant or grease from the bushing pockets, and while in the drawing there are illustrated the preferred embodiments, it is to be understood that the structural elements are susceptible to such variations and modifications as fall within the scope of the appended claims.

What I claim is:—

1. A shackle comprising arms, bushings in said arms having the inner ends for engagement with the eye of a spring and adjustable for wear thereagainst, and a headless pin floating in said bushings.

2. A shackle for a spring having an eye, comprising arms, bushings in said arms affording lubricant chambers, and a pin adapted to extend through the spring eye and float in and be retained by said bushings with the ends of said pin forming walls of said lubricant chambers, and free to rotate in said bushing and in the spring eye at the same time.

3. A shackle comprising arms, bushings in said arms forming the bearing faces of said arms and adjustable for wear, and a headless bearing pin in said bushing, said pin floating freely as regards rotation and shiftability endwise.

In testimony whereof I affix my signature in the presence of two witnesses.

HENRY A. KROH.

Witnesses:
HERBERT A. CARHART,
KARL H. BUTLER.